Nov. 20, 1945.  R. RUSSELL, JR  2,389,386
GLAZED CERAMICS
Filed June 17, 1942

WITNESSES:
Robert C. Baird
T. Shapoe

INVENTOR
Ralston Russell, Jr.
BY Ezra W. Savage
ATTORNEY

Patented Nov. 20, 1945

2,389,386

UNITED STATES PATENT OFFICE 2,389,386

GLAZED CERAMIC

Ralston Russell, Jr., Pittsburgh, Pa., assignor to Westinghouse Electric Corporation, East Pittsburgh, Pa., a corporation of Pennsylvania Application June 17, 1942, Serial No. 447,377

7 Claims. (Cl. 117—125)

This invention relates to ceramic materials and, more particularly, to porcelain bodies provided with glazed surfaces which have good physical properties.

Glazes are ordinarily applied to ceramic members such as porcelain, in order to provide for desirable surface properties. Sometimes glazes are applied to provide for surface coloration. Since glazes are essentially fused glasses, they present smooth surfaces which ordinarily are not characteristic of porcelain. It is well known that glazes improve the electrical properties of porcelains.

In practicing this invention, compression glazes of predetermined chemical composition are applied to porcelain in order to impart good physical properties in addition to the other benefits derived by applying glazes to porcelain.

The object of this invention is to provide a closely bonded, highly compressive, non-shivering glaze on a porcelain body to improve its physical and electrical characteristics.

Other objects of the invention will, in part, be obvious and will, in part, appear hereinafter.

Figure 1:
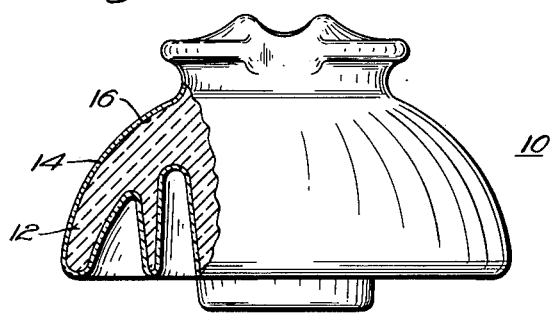
Figure 2:
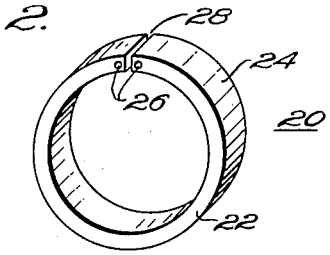
Figure 3:
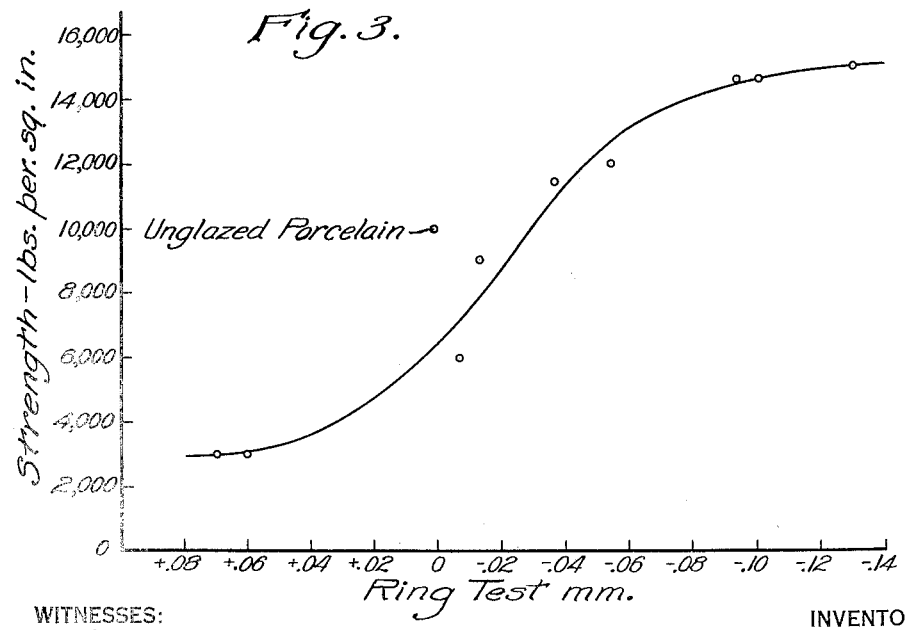

For a fuller understanding of the nature and objects of this invention, reference should be had to the drawing where Fig. 1 is a side elevational view partly broken away of an insulator embodying the invention;

Fig. 2 is a perspective view of a standard glazed porcelain ring-test member; and Fig. 3 is a graph plotting strength against ring-test results for glazed porcelain members.

In producing members from porcelain, it is well known in the art that the application of compression type glazes to the surfaces of the porcelain will improve the physical and electrical characteristics as compared to unglazed porcelain. Since the composition of porcelain may be varied greatly, porcelain articles having physical properties varying through a wide range may be produced. For any given type of porcelain, the applied glaze must bond closely before the product will be satisfactory.

It has been appreciated previously that glazes in tension with respect to the porcelain usually do not produce satisfactory members, the chief defect being low physical properties and a pronounced tendency for the glaze to craze.

Heretofore workers in the art have held that, when glazes are in compression with respect to the porcelain, only a minor degree of compression could be tolerated, otherwise shivering would result.

Since surface applications of glazes have been applied mainly to porcelain bodies in the interest of color, smooth finish and other surface properties, the art of glazing porcelain has been directed to the use of glazes which were of such composition and so fitted the porcelain that very little compression or tension was set up in the glazes employed.

Referring to Fig. 1 of the drawing, there is illustrated a porcelain insulator 10. The insulator 10 consists of a porcelain body 12 with a glaze 14 applied to the surfaces to insure adequate surface electrical resistance. During firing, the glaze 14 and porcelain 12 react chemically along a zone 16. If the applied glaze is relatively inert to the body of porcelain, the surface glaze may not be keyed or bonded adequately to the porcelain and sharp discontinuities may exist. Under the influence of stresses existing between the glaze and the porcelain, shivering or crazing will result. In a well fitted glaze, the reaction of the glaze and porcelain produces a smoothly graduated interaction zone 16 whereby there are no sudden changes but rather a uniform gradation of characteristics. In the last case, the glaze will adhere tenaciously to the porcelain without disruption, even when relatively enormous stresses exist.

In glazing the surfaces of porcelain members, a slip containing glaze ingredients is first applied to the porcelain surfaces. The glaze matures or fuses to a glass when subjected to firing temperatures. Chemical reaction takes place between the fused glaze and the porcelain surfaces whereby the two are bonded.

As the fused glaze and porcelain are cooled, the glaze sets or becomes rigid. If the coefficient of thermal expansion of the glaze differs from that of the porcelain over the range of temperature from the point of development of rigidity of the glaze to room temperature, the glaze will be either in tension or compression with respect to the porcelain. If the average coefficient of thermal expansion is the same for both, then substantially no stresses exist between the porcelain and the glaze when at room temperature. Accordingly the stresses developed and the suitability of a glaze for a particular porcelain member will depend upon the coefficients of thermal expansion of both over the range of temperatures from about that at which the glaze developes rigidity down to room temperature or the temperature at which the porcelain is to be employed.

It has been indicated that in some cases a glaze which is in compression to a porcelain body to which it is applied may improve the physical properties of the body above those properties which are possessed by the porcelain alone. Tensile strength, for example, is favorably affected, according to the prior art, if a compression glaze is applied to porcelain bodies.

Unfortunately, the glazes disclosed in the prior art did not fit porcelain bodies well enough to withstand more than slight degrees of compression. When glazes having a great degree of compression were employed shivering took place and the results were worse than if no glaze were present. For example, in the Rowland Patent No. 2,157,100, it is stated that if the difference in coefficient of thermal expansion between the glaze and the porcelain exceeds 15%, crazing or cracking may take place, and the patentee suggests that a 10% difference in coefficient of expansion is about the maximum that may be tolerated in commercial practice. It is possible that the reason for setting such a limit for compression in the glaze is due to the fact that the compositions of the glaze and the porcelain were such that on firing the glaze failed to bond itself intimately enough to the porcelain.

According to this invention, glazes are produced that in commercial practice are under much higher compression than considered feasible according to prior art teaching without shivering or other failure taking place. As a result of using glazes under such high compression ceramic members of exceedingly high physical strength properties are produced.

In order to show the relative compressibility of glazes upon a given porcelain body several tests are known. For example, the glaze ingredients may be drawn into test specimens independently of porcelain by melting the glaze ingredients alone in a crucible. A modification of this test method involves melting a mass of glaze in a depression in a porcelain body and separating the mass of glaze from the porcelain on cooling to room temperature. By measuring the changes in length over the range of temperatures between room temperature and the point of development of rigidity of the glaze and comparing this with the expansion of unglazed porcelain over the same range, it is possible to determine the difference in coefficients of expansion and thereby obtain some indication of the relative compression which the glaze would have when applied in the usual manner to the porcelain. This test, however, is subject to a very serious error, since the same glaze fused as a thin film in contact with porcelain reacts therewith to a very considerable extent, and the characteristics of a glaze film on porcelain may be notably different from that of the glaze alone. This is due to the fact that fluxing constituents of both body and the glaze react upon the more refractory components to change the composition of the glaze. It will be understood that glazes applied to porcelain are very thin, generally of the order of 1/64 of an inch and thinner.

A test more consonant with the actual conditions obtained in fired glazed porcelain consists in testing surface chips broken off or removed from glazed porcelain. These chips when prepared by grinding to predetermined shape may be tested for thermal expansion characteristics by means of an interferometer over the range of temperatures between room temperature and fusion temperature or the point of development of rigidity of the glaze. The test gives accurate information about the thermal expansion characteristics of a glaze as associated with fired porcelain.

From extensive comparison of tests, it is believed that the ring-test disclosed by H. D. Schurecht and G. R. Pole in the "Journal of American Ceramic Society" for 1930, entitled "Method of measuring strains between glazes and ceramic bodies," on pages 369 to 375, and as modified by H. G. Davis and R. L. Lueders as reported in "Journal of American Ceramic Society," vol. 15, No. 1, pp. 34 to 36, in an article entitled "Simplification of ring method for determining glaze stresses," is a reliable practical test for determining porcelain and associated glaze stress characteristics.

The ring test employed in this application consists in the use of ring-shaped porcelain bodies 3 inches in diameter, approximately ¼ inch thick, and ½ inch long. The porcelain rings are glazed upon their exterior surface only, no glaze being applied to the inner surfaces or the edges of the ring. Each ring is fired under the same conditions that the usual porcelain bodies would be fired. After cooling to room temperature, one edge of the ring is marked with reference points approximately ¼ inch apart. The distance between the two reference points is initially measured with a micrometer microscope with filar eyepiece. Thereafter the ring between the reference points is severed by removing a thickness of the porcelain by means of a diamond saw or the like. Upon cutting the ring, the relative stresses induced by the glaze upon the porcelain will cause the ring to contract if the glaze is in compression or to expand the ring if in tension. Remeasuring the distance between the reference points will indicate the change in distance and give an indication of the relative stresses that exist. By a "standard ring test" in the claims applicant refers to rings of this size tested in the manner disclosed.

Referring to Fig. 2 of the drawing, there is shown a ring member 20 of the type described, the member consisting of the porcelain ring or hollow cylinder 22 with glaze 24 applied only to the outer periphery of the ring. The reference points 26 provide for the taking of measurements before and after severing the ring. The cut 28 is produced by sawing.

The ring test has been found to closely correlate with actual results obtained. The results have been closely duplicated from various samples of the same composition, and it is believed that the test is the most practical known to indicate the conditions resulting from applying a glaze to a porcelain body.

It has been discovered that a high silica glaze having such characteristics that it fits well to practically all porcelains, and particularly well to electrical porcelain, produces unexpected improvements in physical properties in porcelain to which it is applied.

Two related series of glaze compositions have been found to produce the desirable features of the invention. The first is a relatively high magnesia glaze having the following molecular composition:

*Molecular composition A*

0.2–0.3 $KNaO$
0.2–0.45 $CaO$ } 0.6–0.75 $Al_2O_3$  5.4–7.0 $SiO_2$
0.25–0.5 $MgO$ 1.0 mol. total.

The other is a high calcium glaze having the following molecular composition:

*Molecular composition B*

0.2–0.3 $KNaO$
0.45–0.7 $CaO$ } 0.6–0.75 $Al_2O_3$  5.4–7.0 $SiO_2$
0.1–0.25 $MgO$ 1.0 mol. total.

In both of the molecular composition above, various coloring oxides, for example, $MnO_2$, $Fe_2O_3$, $Cr_2O_3$, $CaO$, and $Ni_2O_3$ may be added.

In some cases, barium oxide and zinc oxide may replace the calcium oxide and magnesia in limited amounts, not to exceed the molecular equivalent of calcium oxide. Fluorspar may be substituted for the calcium oxide with as good results, or in some cases with a smoother glaze being effected by the substitutions. KNaO may be replaced with $Li_2O$ partially or completely. In order to increase gloss and maturity, boron oxides may be added up to 0.4 molar equivalents. In producing white glazes, opacifiers such as zircon, zircon oxide, and tin oxide, for example, may be added.

The best results were obtained with the glazes in the above formulae when manganese oxides ranging in amount of from 3% to 6% of the weight of the glaze were present. Chocolate and mahogany glazes produced with this amount of manganese oxide gave outstanding results in the way of strength and other physical characteristics. Accordingly, the use of manganese oxide, or compounds yielding manganese oxide when subjected to firing temperatures, is desirable for attaining the optimum properties.

The glaze ingredients may be put into condition for use by subjecting them directly to ball milling until a finely pulverized and intimately commingled mass is produced. Alternatively the glaze ingredients may be fritted and then ball milled into a pulverulent state. It has been found that best results are obtained in glazing if the ingredients are well pulverized. The powdered ingredients are suspended in water according to conventional practice to secure a suitable viscosity and other characteristics.

The glazes disclosed in the above formulae may be applied to a wide variety of vitreous porcelain. Steatite porcelains give the best results with the glazes of this invention. Electrical porcelain, both high and low tension, combines with the glazes equally well. Sanitary china and the like also exhibit good results. In some cases, chemical ware, such as evaporating dishes and the like, gives good results when prepared with the same glazes.

In order to show the results obtained by the use of this type of glaze, reference should be had to Fig. 3 of the drawing. The curve shown in Fig. 3 is plotted from the transverse strength of a number of glazed porcelain bar test members, as well as an unglazed porcelain member, against the ring test of the same materials as shown in the table below.

Table I

| Glaze | Ring test, mm. | Modulus of rupture, #/in.² for test bar |
|---|---|---|
| Standard chocolate #1 | (+).0693 | 3,000–4,000 |
| Standard green | (+).0594 | 3,000–4,000 |
| Standard white | (−).0045 | 6,000 |
| Standard chocolate #2 | (−).0140 | 8,500 |
| White | (−).0387 | 11,300 |
| Standard mahogany | (−).0542 | 12,000 |
| High strength mahogany #1 | (−).0952 | 14,600 |
| High strength chocolate | (−).1012 | 14,600 |
| High strength mahogany #2 | (−).1259 | 15,000 |
| Unglazed porcelain | (−).000 | 10,000 |

(+) Indicates glaze in tension.
(−) Indicates glaze in compression.

The "high strength" glazes are those embodied in the present invention while the other glazes are those which have been used by assignee of this application in previous commercial work. It will be observed from the curve that the normal properties of porcelain are greatly diminished by the use of a glaze that is in tension or by using a glaze that has substantially no difference in thermal expansion as compared to the porcelain. When the glaze is in compression with respect to the porcelain, the physical properties rapidly increase to values better than those exhibited by the unglazed porcelain. The three highest values from the curve are those secured by the application of the high silica glazes of this invention to porcelain.

Other properties of the porcelain are effected besides the transverse strength. Impact strength is greatly improved, as shown by the following table:

Table II

| | Suspension insulators | | |
|---|---|---|---|
| | Percent failure, 1 blow at 90 in./lbs. | In./lbs. average failure | In./lbs. maximum value |
| Standard mahogany | 20 | 100–120 | Few pass 130 |
| High strength mahogany | 0 | 150 | 150 |
| Standard mahogany—refired | 70 | 90 | 110 |
| High strength mahogany—refired | 40 | 100 | 130 |

By reference to applicant's curve in Fig. 3, glazes having a contraction of nearly 0.13 millimeter were produced. Though the ceramic materials are undoubtedly different, the rings prepared by applicant give results of the same order as those in the Schurecht et al. and Davis et al. articles referred to above. The high strength glazes have been produced commercially in great numbers without any appreciable shivering or failure of the glaze mechanically. Accordingly, applicant has produced a glaze whose physical characteristics are radically different from those known to the prior art.

As one specific example of the invention, a typical electrical porcelain of the following composition was prepared:

Table III

Porcelain:                                         Per cent
  Felspar A3P _____ 33
  Flint _____ 18
  Ball Clay (Ky.) _____ 23
  Fla. kaolin _____  8
  Ga. kaolin _____ 18
                                                 ———
                                                 100

A high strength chocolate glaze composed of the following ingredients was applied to the electrical porcelain:

Table IV

Per cent
Oxford feldspar _____ 20.4
Whiting _____  9.9
Talc (tremolitic) _____  4.4
Kentucky ball clay _____ 17.9
Ga. kaolin _____  8.7
Flint _____ 38.7
                                                —————
                                                100.0

Coloring oxides:
  $MnO_2$ _____ 4.0
  $Fe_2O_3$ _____ 2.5
  $Cr_2O_3$ _____ 0.5
  $CoO$ _____ 0.1
                                                ———
                                                7.1

The porcelain was molded to shape by conventional methods. The green porcelain was dipped in the glaze slip prepared by finely grinding the constituents of the glaze and dispersing them in water. The glaze slip may be sprayed or even painted on the unfired or green porcelain. The coated green porcelain was fired in kilns at a porcelain maturing temperature at pyrometric cones 11 to 12. It is preferred to fire the porcelain and glaze in a single operation. It will be appreciated that in some cases the porcelain may be fired prior to the application of the glaze with the glaze applied in a subsequent operation and fired thereafter. After firing, the ceramic members were annealed at a temperature of 550° C. to 625° C. This practice is conventional and need not be illustrated in detail. The glazed porcelain had properties corresponding to those of the high strength chocolate glaze in Table I.

The glazes prepared according to the above formulae A and B have a maturing temperature when fired to temperatures corresponding to pyrometric cones 8 to 13. These glazes contain an unexpectedly high proportion of silica for such relatively low maturing temperatures. Since electrical porcelain matures within the same range, the use of the glazes of this invention for this type of porcelain is both economical and beneficial. In both compositions A and B, 70% to 82% of the weight of the glaze consists of silica, while alumina comprises from 11% to 18%. The presence of the large amount of silica is of advantage, since it produces a glaze having a low coefficient of thermal expansion, much lower than known glazes maturing at the temperatures indicated, and, therefore, the compression produced between the applied glaze and the porcelain member is greater than that of the prior art accepted practice. However, the glazes fit so well to porcelain that shivering or other undesirable faults have not been encountered in manufacturing practice.

Tests of the relative difference in coefficient of thermal expansion between glazes prepared according to the above formulae applied to electrical porcelain as determined by an interferometer test show a difference in coefficient of thermal expansion of the order of 23%. This difference is beyond that which has been deemed possible to use in producing satisfactory compression glazed porcelain on a commercial scale.

Since certain changes can be made in the above invention and different embodiments of the invention can be made without departing from the scope thereof, it is intended that all matter contained in the above description shall be interpreted as illutrative and not in a limiting sense.

I claim as my invention:

1. A ceramic member having high physical properties comprising, in combination, a porcelain body and a smooth insulating glaze applied to the surface of the porcelain body, the glaze maturing at cones 8 to 13 and composed of from about 70% to 82% silicon dioxide, about 10% to 18% of alumina, 3% to 7% of one or more alkali metal oxides selected from the group consisting of potassium oxide, sodium oxide, and lithium oxide, and the balance including manganese oxides and fluxing oxides including one or more of the group consisting of calcium oxide, barium oxide, zinc oxide, boron oxide, and magnesium oxide, and small amounts of opacifiers and impurities being present in the glaze, the glaze being in high compression relative to the porcelain body at normal operating temperatures and so fitting the porcelain that it does not shiver or otherwise fail.

2. A ceramic member having high physical properties comprising, in combination, a porcelain body and a smooth insulating colored glaze applied to the surface of the porcelain body, the glaze composed of from about 70% to 82% silicon dioxide, about 10% to 18% of alumina, 3% to 6% of manganese oxide, 3% to 7% of one or more alkali metal oxides selected from the group consisting of potassium oxide, sodium oxide, and lithium oxide, and the balance being fluxing oxides including one or more of the group consisting of calcium oxide, barium oxide, zinc oxide, boron oxide, and magnesium oxide, and small amounts of coloring oxides and impurities being present in the glaze, the glaze being in high compression relative to the porcelain body at normal operating temperatures and so fitting the porcelain that it does not shiver or otherwise fail.

3. A ceramic member having high physical properties comprising, in combination, a porcelain body and a smooth insulating glaze applied to the surface of the porcelain body, the glaze maturing at cones 8 to 13 and composed of from about 70% to 82% silicon dioxide, about 10% to 18% of alumina, 3% to 7% of one or more alkali metal oxides selected from the group consisting of potassium oxide, sodium oxide, and lithium oxide, and the balance including manganese oxide and fluxing oxides including 1½% to 5% of calcium oxide and 1½% to 5% of magnesium oxide, and small amounts of opacifiers and impurities being present in the glaze, the glaze being in high compression relative to the porcelain body at normal operating temperatures and so fitting the porcelain that its does not shiver or otherwise fail.

4. A ceramic member having high physical properties comprising, in combination, a porcelain body and a smooth insulating glaze applied to the surface of the porcelain body, the glaze maturing at cones 8 to 13 and composed of from 70% to 82% silicon dioxide, 10% to 18% alumina, 3% to 7% of one or more alkali metal oxides selected from the group consisting of potassium oxide, sodium oxide, and lithium oxide, and the balance including manganese oxide and fluxing oxides including 4% to 10% of calcium oxide and ½% to 2½% of magnesium oxide, small amounts of opacifiers and impurities being present in the glaze, the glaze being in high compression relative to the porcelain body at normal operating temperatures and so fitting the porcelain that it does not shiver or otherwise fail.

5. A ceramic member having high physical properties comprising, in combination, a porcelain body and a smooth insulating colored glaze applied to the surface of the porcelain body, the glaze, maturing at cones 8 to 13 and composed of from 70% to 82% silicon dioxide, 10% to 18% of alumina, 3% to 6% of manganese oxide, 3% to 7% of one or more alkali metal oxides selected from the group consisting of potassium oxide, sodium oxide, and lithium oxide, and the balance being fluxing oxides, including 1½% to 5% of calcium oxide, and 1½% to 5% of magnesium oxide, small amounts of coloring oxides and impurities being present in the glaze, the glaze being in high compression relative to the porcelain body at normal operating temperatures and so fitting the porcelain that it does not shiver or otherwise fail.

6. A ceramic member having high physical properties comprising, in combination, a porcelain body and a smooth insulating colored glaze maturing at cones 8 to 13 applied to the surface of the porcelain body, the glaze composed of from 70% to 82% silicon dioxide, 10% to 18% alumina, 3% to 6% of manganese oxide, 3% to 7% of one or more alkali metal oxides selected from the group consisting of potassium oxide, sodium oxide, and lithium oxide, and the balance being fluxing oxides including 4% to 10% of calcium oxide and ½% to 2½% of magnesium oxide, small amounts of coloring oxides and impurities being present in the glaze, the glaze being in high compression relative to the porcelain body at normal operating temperatures and so fitting the porcelain that it does not shiver or otherwise fail.

7. A ceramic member having high physical properties comprising, in combination, a porcelain body and a smooth insulating glaze applied to the surface of the body, the glaze composed mainly of from 5.4 to 7.0 mols silica, from 0.6 to 0.75 mol alumina and one mol of fluxing oxides composed of from 0.2 to 0.3 mol of alkali metal oxide, from 0.2 to 0.7 mol calcium oxide and from 0.5 to 0.1 mol of magnesia and the balance of the glaze composed of from 3% to 6% by weight of manganese oxides and small amounts of opacifiers and impurities, the glaze having a lesser coefficient of thermal expansion than the porcelain and being in high compression to the porcelain at normal operating temperatures.

RALSTON RUSSELL, Jr.